(12) United States Patent
Kato et al.

(10) Patent No.: US 7,925,434 B2
(45) Date of Patent: Apr. 12, 2011

(54) IMAGE-RELATED INFORMATION DISPLAYING SYSTEM

(75) Inventors: Hideaki Kato, Tokyo (JP); Koji Ueda, Tokyo (JP); Akira Kurosawa, Tokyo (JP)

(73) Assignee: Hitachi Software Engineering Co., Ltd., Tokyo (JP)

( * ) Notice: Subject to any disclaimer, the term of this patent is extended or adjusted under 35 U.S.C. 154(b) by 606 days.

(21) Appl. No.: 11/987,849

(22) Filed: Dec. 5, 2007

(65) Prior Publication Data

US 2008/0154494 A1   Jun. 26, 2008

(30) Foreign Application Priority Data

Dec. 20, 2006   (JP) .................................. 2006-343438

(51) Int. Cl.
*G01C 21/30*   (2006.01)
(52) U.S. Cl. ........ 701/208; 701/200; 701/207; 701/209; 701/210; 701/211
(58) Field of Classification Search .................. None
See application file for complete search history.

(56) References Cited

U.S. PATENT DOCUMENTS

| | | | | |
|---|---|---|---|---|
| 6,014,145 | A * | 1/2000 | Bardon et al. ................. | 345/427 |
| 6,512,857 | B1 * | 1/2003 | Hsu et al. ...................... | 382/294 |
| 2003/0160867 | A1 * | 8/2003 | Ohto et al. .................... | 348/135 |
| 2007/0103461 | A1 * | 5/2007 | Suzuno et al. ................. | 345/419 |
| 2007/0124071 | A1 * | 5/2007 | Joo et al. ....................... | 701/211 |
| 2008/0069404 | A1 * | 3/2008 | Lee et al. ...................... | 382/106 |
| 2009/0046093 | A1 * | 2/2009 | Kikuchi et al. ............... | 345/419 |
| 2009/0293012 | A1 * | 11/2009 | Alter et al. .................... | 715/810 |

FOREIGN PATENT DOCUMENTS

JP   2001-204062   1/2000

* cited by examiner

*Primary Examiner* — Khoi Tran
*Assistant Examiner* — Jonathan L Sample
(74) *Attorney, Agent, or Firm* — Stites & Harbison PLLC; Juan Carlos A. Marquez, Esq.

(57) ABSTRACT

An image-related information displaying system includes: a host system having a three-dimensional land feature/place name information database and a delivery service subscriber list database; and multiple mobile terminal devices, each of which receives land feature/place name information from the host system and is connected to a base station via respective radio channels The base station is connected to a network, such as a wired public telephone circuit network, and the host system is connected thereto. Individual mobile terminal devices and the host system are bilaterally connected via the radio channels and the network which both reach to the base station. The base station corresponds to a base station managed by a cellular phone service provider when cellular phones are used as radio transmitter-receiver means. The host system includes the three-dimensional land feature/place name information database and the delivery service subscriber list database. Data on three-dimensional coordinates of representative points which represent land features, for example, throughout Japan, and the corresponding name and information are registered in the three-dimensional land feature/place name information database in the host system. The host system includes a retrieval processor unit for performing a process of retrieving land feature information from the three-dimensional land feature/place name information database in response to a request for the land feature information from one of the mobile terminal devices, and a transmitter-receiver unit for transmitting and receiving data between the host system and each of the mobile terminal devices.

8 Claims, 10 Drawing Sheets

[LAND FEATURE ATTRIBUTE TABLE]

| ID(51) | LAND FEATURE TYPE (53) | LAND FEATURE NAME (54) | INFORMATION URL (55) |
|---|---|---|---|
| 1 | MOUNTAIN | Mt. FUJI | http://www.fujisan-net.jp/ |
| 2 | LAKE | LAKE TANUKI | http://www.tanuki-ko.gr.jp/ |
| 3 | BUILDING | TOKYO TOWER | http://www.tokyotower.co.jp/333/ |
| 4 | BUILDING | TOKYO PRINCE HOTEL | http://www.princehotels.co.jp/tokyo/index.html |
| 5 | PARK | SHIBA PARK | http://www.tokyo-park.or.jp/park/format/index001.html |

(B)

[LAND FEATURE ATTRIBUTE TABLE]

| ID(51) | THREE-DIMENSIONAL COORDINATES (NEH) OF LAND FEATURE REPRESENTATIVE POINT (52) | THREE-DIMENSIONAL COORDINATES (xyz) OF LAND FEATURE REPRESENTATIVE POINT (56) |
|---|---|---|
| 1 | (35.360375, 138.728969, 3776.0) | (-3916204.294, 3436962.842, 3672755.252) |
| 2 | (35.341650, 138.561200, 663.0) | (-3905121.452, 3447530.427, 3669258.868) |
| 3 | (35.658636, 139.745430, 24.0) | (-3959550.345, 3352548.991, 3697518.235) |
| 4 | (35.658919, 139.747947, 19.0) | (-3959680.542, 3352360.588, 3697540.828) |
| 5 | (35.655102, 139.748677, 14.0) | (-3959908.557, 3352467.016, 3697193.786) |
| 5 | (35.658211, 139.749175, 14.0) | (-3959784.234, 3352302.679, 3697474.080) |
| 5 | (35.658144, 139.749541, 13.0) | (-3959808.335, 3352279.659, 3697467.456) |

FIG. 4

| SUBSCRIBER NAME (111) | TELEPHONE NUMBER (112) | TERM OF SUBSCRIPTION CONTRACT (1113) | SURVICE CHARGE DISCOUNT RATE (114) |
|---|---|---|---|
| TOMINAGA ○○ | 111-1111-1111 | '05/01/01～'07/01/01 | 0% |
| SAKAGAMI ○□ | 222-2222-2222 | '05/02/02～'07/02/02 | 5% |
| KITAJIMA □○ | 333-3333-3333 | '05/03/03～'07/03/03 | 10% |
| ITO △○ | 444-4444-4444 | '05/04/04～'07/04/04 | 5% |
| NOGUCHI △□ | 555-5555-5555 | '05/05/05～'07/05/05 | 0% |

FIG. 5

| ATTRIBUTE NAME | ATTRIBUTE VALUE |
|---|---|
| PHOTOGRAPHING POINT X-COORDINATE (201) | -3960627.780 m |
| PHOTOGRAPHING POINT Y-COORDINATE (202) | 3352144.690 m |
| PHOTOGRAPHING POINT Z-COORDINATE (203) | 3696729.000 m |
| CAMERA ANGLE OF VIEW (DIAGONAL LINE) (204) | 20 DEGREES |
| CAMERA POSTURE (ROLL) (205) | 0 DEGREE |
| CAMERA POSTURE (YAW) (206) | 0 DEGREE |
| CAMERA POSTURE (PITCH) (207) | 0 DEGREE |
| TRANSMISSION SOURCE ID (208) | 111-1111-1111 |
| DEPTH OF FIELD (209) | 10 m |
| DISTANCE TO SUBJECT (210) | 160 m |
| MAXIMUM TELEPHOTO DISTANCE (211) | 1km |

| ID (501) | LAND FEATURE NAME (502) | ON-SCREEN DISPLAY POSITION (503) | LAND FEATURE TYPE (504) | INFORMATION URL (505) |
|---|---|---|---|---|
| 3 | TOKYO TOWER | 0.0, 0.0 | BUILDING | http://www.tokyotower.co.jp/333/ |
| 4 | TOKYO PRINCE HOTEL | 0.3, -0.7 | BUILDING | http://www.princehotels.co.jp/tokyo/index.html |
| 5 | SHIBA PARK | -0.1, -0,8 | PARK | http://www.tokyo-park.or.jp/park/format/index001.html |
| ... | ... | ... | ... | |

FIG. 9
(A)
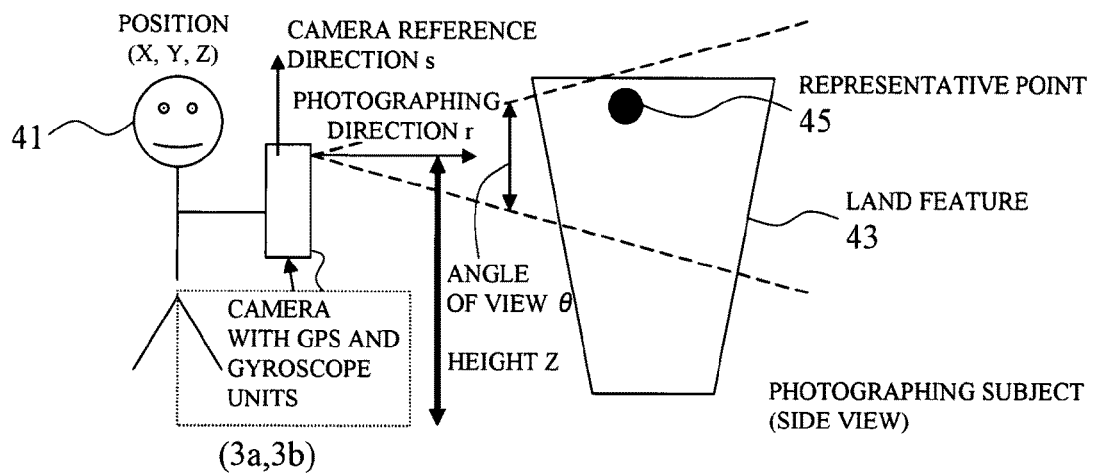
(B)
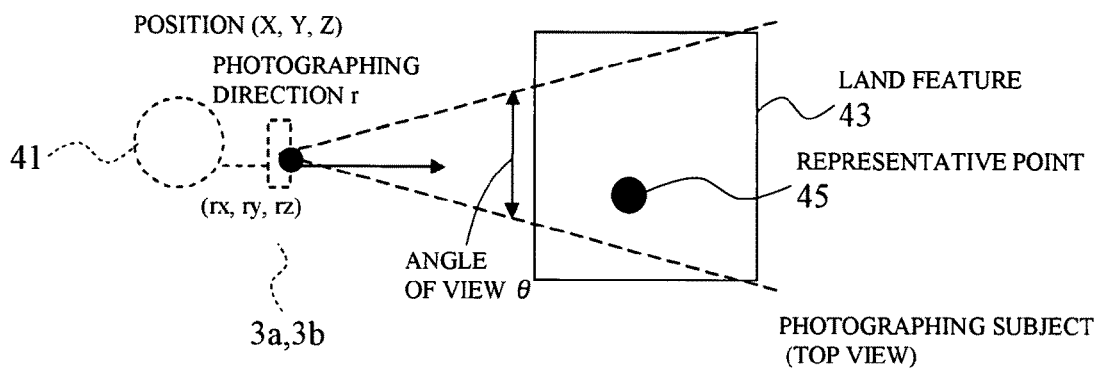

FIG. 13
(A)
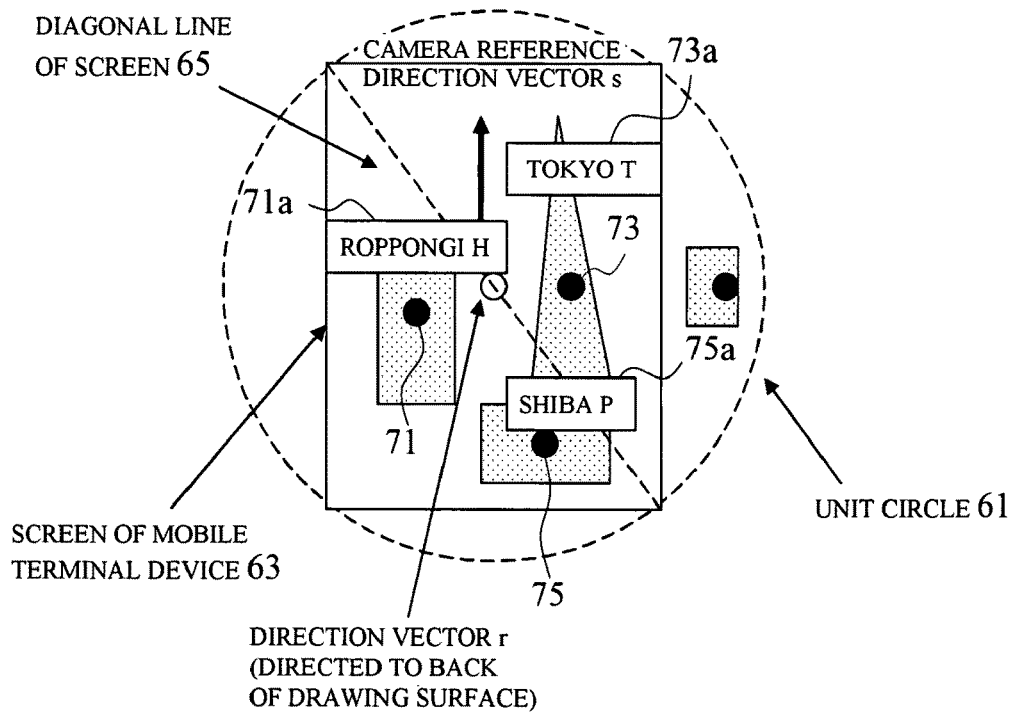
(B) LEGEND:
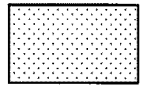 LAND FEATURE VISIBLE RANGE
 ON-SCREEN DISPLAY POSITION (REPRESENTATIVE POINT)
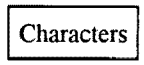 LAND FEATURE NAME WITH INFORMATION URL ADDED TO LINK

DISPLAYING SUPERIMPOSING IMAGE
OF LAND FEATURE INFORMATION
ON PHOTOGRAPHED IMAGE

IMAGE-RELATED INFORMATION DISPLAYING SYSTEM

BACKGROUND OF THE INVENTION

1. Field of the Invention

The present invention relates to an image-related information displaying system for acquiring and displaying different pieces of information, such as map data and position information, which relate to an image photographed and displayed by a portable terminal device (mobile terminal device) having a camera photographing function for handling image-related information.

2. Description of Related Art

With development in automobiles, road network systems, and public transportation facilities, traveling to remote areas has become increasingly easy. Although people are much more accustomed to traveling various places, information, such as maps, is still indispensable when they are traveling in new areas.

A navigation system to provide the current position and the destination to a user by utilizing the GPS (Global Positioning System) and a mobile terminal device, such as a cellular phone, has been widely used in recent years. The navigation system detects the current position of the user by receiving electric waves on the terminal device from one of the GPS satellites, transfers the location data to a host system, and acquires map information around the current position. One example of the system use has been disclosed by Japanese Patent Application Laid-open Publication No. 2001-204062, entitled "Navigation System; Center Station, Radio Base Station and Portable Terminal Devices Using Navigation System; Map Extracting Method; and Service Charge Settlement Method."

SUMMARY OF THE INVENTION

When a pedestrian navigation system is used for destination guidance, it is important that the user of the system recognizes his/her current position, and land features and buildings in the direction he/she is facing. There are two methods which allow the user to recognize such objects. One is a generally-used method in which the user's current position and the direction he/she is going towards (heading) are shown on a two-dimensional map. Another is a method in which three-dimensional map information based on the user's current position and the direction he/she is heading are displayed. Between these two methods, the latter is more promising because it allows a user to visually recognize information more easily, and to grasp the information intuitionally.

However, use of three-dimensional map information exceedingly increases the amount of data required for processing. In a case where a texture image is pasted on the surface of a three-dimensional graphic, the level of computational complexity for the screen generation process becomes extraordinarily high. It takes longer for a host computer to perform processing, for data to be transferred from the host computer to a terminal device, and for the data to be displayed on the terminal device; thus, an inconvenience arises in which the delay time from the initiation of the operation to the time the data is displayed on the terminal device becomes too large. Furthermore, in scenic areas, for example, where large numbers of homogeneous land features, such as mountains, can be observed, and the visible size of landmarks, such as a sightseeing tower, becomes inconveniently small to be clearly identified easily, an inconvenience arises in which it is difficult to specifically identify a target land feature of interest, such as a mountain or a hardly-visible building.

An object of the present invention is to enable a smooth operation for displaying image-related information.

A means for solving the above-described problem is to provide an image-related information displaying system in which a terminal device is designed to use an image photographed with its own camera photographing function as a background instead of using particularly background map information among three-dimensional map information pieces, and, based on photographing viewpoint information obtained from photographing information, the terminal device acquires only data on names of land features and of buildings from a host system. The image-related information displaying system can largely reduce time required for the host system to process the data on the background, for the data to be transferred from the host system to the terminal device, and for the data to be displayed on the terminal device. The image-related information also allows three-dimensional map information to be configured in the terminal device based on the background map derived from the image photographed on the site, and enables a user to accurately identify a target feature, which he/she is currently focusing on and to operate the terminal device smoothly.

A first aspect of the present invention provides an image-related information displaying system including a host system having a three-dimensional land feature/place name information database which stores three-dimensional land feature/place name information including information on three-dimensional position of land features and land feature-related information related to the land features, and multiple mobile terminal devices capable of being connected to the host system. The map-related information distributing system is characterized as follows. Each of the mobile terminal devices includes an image photographing unit for photographing an image, a current-position detecting unit for detecting a current position, a three-dimensional posture/direction detecting unit for detecting a three-dimensional posture at the time of photographing and the direction the image photographing unit faces (hereafter referred to as "photographing direction"), and a communications unit. The host system includes a retrieving unit for receiving the current position, the three-dimensional posture at the time of photographing and the photographing direction from one of the mobile terminal devices, and for, on the basis of these conditions, retrieving land feature information from the three-dimensional land feature/place names information database. Each of the mobile terminal devices, which receives the land feature information retrieved by the retrieving unit, includes a display control unit for displaying on a display unit a superimposing image of the land feature information on the photographed image.

Another aspect of the present invention provides a mobile terminal device including: a current position retrieving unit for acquiring the current position; a three-dimensional posture/direction detecting unit for detecting a three-dimensional posture and a photographing direction; an image photographing unit for photographing an image; and a communications unit. The mobile terminal device also includes a display control unit which uses the image photographed with the image photographing unit as a background, and, based on the current position, the three-dimensional posture, and the photographing direction, acquires land feature-related information corresponding to the photographed image, and displays a superimposing image of the land feature/place name information on the photographed image.

The image-related information displaying system according to the present invention brings about the following effect.

The mobile terminal device is designed to use an image, which has been photographed with its own camera photographing function, as a background, instead of using particularly a background map information piece among three-dimensional map information pieces. Thereby, based on the photographing condition information obtained from the photographing information, the mobile terminal device can acquire only data on names of the visible land features and building from the host system. As a result, the system can largely reduce time require for the host system to proves the data on the background, for the data to be transferred, and the data to be displayed on the terminal device, allows three-dimensional map information to be configured in the terminal device based on the latest background map, and enables a user to operate the terminal device smoothly and quickly.

BRIEF DESCRIPTIONS OF THE DRAWINGS

FIGS. 3A and 3B are diagrams each showing an example of a configuration of data stored in a three-dimensional land feature/place name information database.

FIG. 4 is a diagram showing an example of a configuration of data stored in a delivery service subscriber list database.

FIG. 5 is a diagram showing an example of a configuration of data which the mobile terminal device transmits to a host system.

FIGS. 9A and 9B are schematic diagrams each showing an example of an actual photographing space region.

FIG. 13A is a schematic diagram showing how to find each set of coordinates on-screen display positions of land features, and FIG. 13B is the legend for FIG. 13A.

DETAILED DESCRIPTION OF THE PREFERRED EMBODIMENT

In this description, land feature-related information mainly includes information, such as land feature names, required for identification of land features, such as buildings, parks, bridges, and towers, and other information, such as the height of a tower, related to land features.

Figure 1:
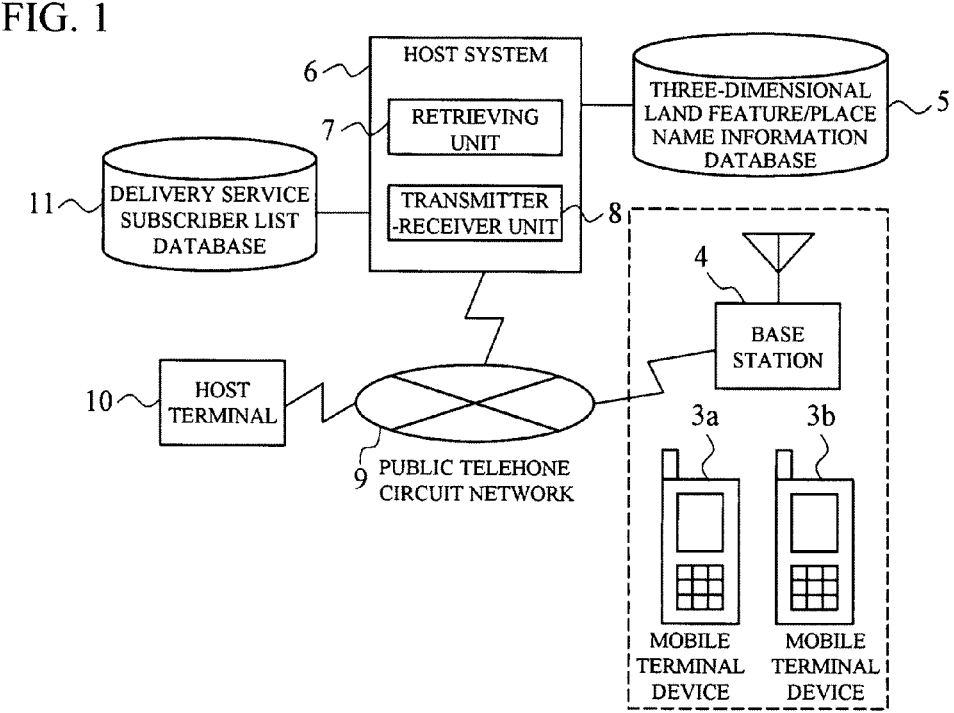
FIG. 1 is a system configuration diagram showing an example of a configuration of an image-related information displaying system according to an embodiment of the present invention.

An image-related information displaying system according to an embodiment of the present invention will be described below by referring to the drawings. FIG. 1 is a diagram showing an example of a configuration of the image-related information displaying system according to the present embodiment. As shown in FIG. 1, the image-related information displaying system is configured by including a host system 6 which is connected to a three-dimensional land feature/place name information database 5 and a delivery service subscriber list database 11, and multiple mobile terminal devices 3a, 3b, . . . each of which receives land feature/place name information from the host system 6. These mobile terminal devices 3a, 3b, . . . are connected to a base station 4 via respective radio channels. The base station 4 is connected to a network 9 which is, for example, a wired public telephone circuit network, and the host system 6 is connected to this network 9. Examples of the mobile terminal devices 3a, 3b, . . . include cellular phones and PDAs (Personal Digital Assistances).

As described above, each of the mobile terminal devices 3a, 3b, . . . and the host system 6 are connected to each other via the radio channels and the network 9 which both reach to the base station 4. The base station 4 corresponds to a base station managed by a cellular phone service provider in a case where, for example, cellular phones are used as radio transmitter-receiver means. The host system 6 is provided with the three-dimensional land feature/place name information database 5 and the delivery service subscriber list database 11.

Data on three-dimensional coordinates of each of representative points which represent land features, for example, throughout Japan, and the corresponding land feature-related information, such as land feature type 53, land feature name 54, and the access information 55, are registered in the three-dimensional land feature/place name information database 5 provided in the host system 6.

The host system 6 includes a retrieval processor unit 7 for performing a process of retrieving land feature information from the three-dimensional land feature/place name information database 5 in response to a request for the land feature information from one of the mobile terminal devices 3, and a transmitter-receiver unit 8 for transmitting and receiving data between the host system 6 and each of the mobile terminal devices 3.

Host terminals 10 installed in local tourism associations and local governments may be connected to the network 9. In addition, the image-related information displaying system may be configured such that land feature information in the region or territory in charge can be updated and registered at the host terminals 10.

Figure 2:
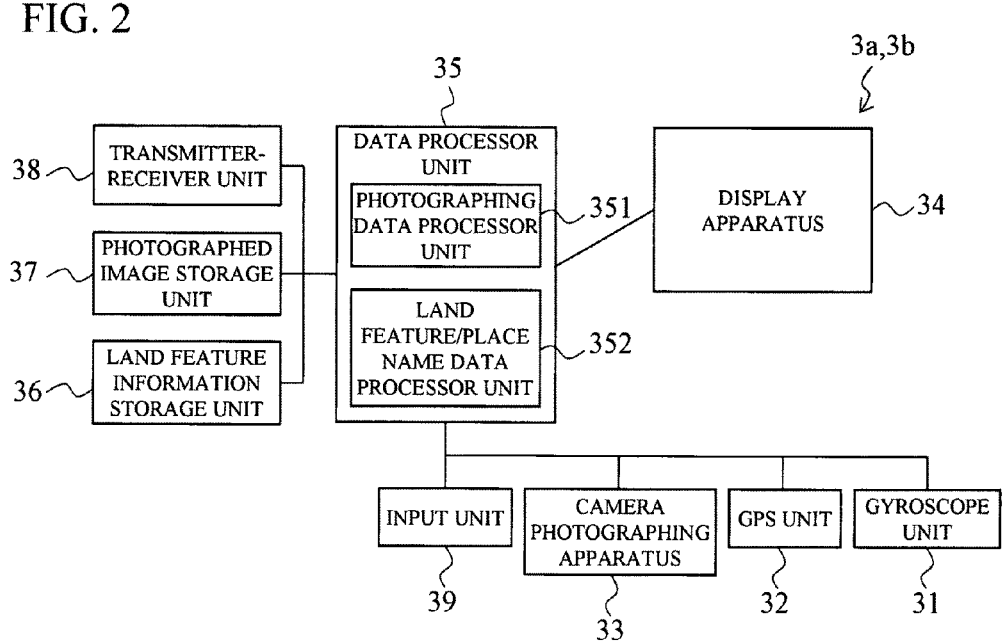
FIG. 2 is a block diagram showing an example of an internal configuration of a mobile terminal device according to the embodiment.

FIG. 2 is a diagram showing an example of a configuration of the mobile terminal devices 3a and 3b. Each of the mobile terminal devices 3a and 3b includes: a gyroscope unit 31 for detecting the posture of the mobile terminal device; a GPS unit 32 for detecting the current position of the mobile terminal device by receiving electric waves from a satellite; a photographing apparatus (camera) 33 for photographing an image; an LCD (Liquid Crystal Display) apparatus 34 for displaying a result of the process; a data processor unit 35 for creating display information on the basis of photographing information and land feature information; a land feature information storage unit 36 for storing land feature information acquired from the host system 6 (FIG. 1); a photographed image storage unit 37 for storing the photographed image; and a transmitter-receiver unit for communicating with the host system 6. The photographing apparatus (camera) 33 may be provided with a focusing judgment unit for determining focusing based on distance surveying.

The data processor unit 35 includes a photographing data processor unit 351 and a land feature/place name data processor unit 352. The gyroscope unit 31 includes an azimuth (yaw direction) sensor for detecting geomagnetism and a gravity (roll and pitch directions) sensor for detecting a gravitational direction.

Land feature information to be stored in the three-dimensional land feature/place name information database 5 is configured to include, as shown in FIGS. 3A and 3B, each piece of data on an ID (Identification) 51, a set of three-dimensional coordinates (NEH) 52 at a representative point, land feature type 53, land feature name 54, information URL (Uniform Resource Locator) 55 with which information can be acquired, and a set of three-dimensional coordinates (xyz) 56 at a representative point. The set of three-dimensional coordinates (NEH) 52 of the representative point is the land feature's representative point in terms of geodetic coordinates (latitude, longitude, height (m)) based on the WGS 84 (World Geodetic System) coordinate system which is used for cellular phone, for example. The set of three-dimensional coordinates (xyz) 56 of the land feature's representative point is a set of three-dimensional coordinates (x, y, z) obtained by converting the set of three-dimensional coordinates (NEH) 52 of the land feature's representative point to a set of three-dimensional coordinates in the geocentric coordinate system, and the unit of measurement is meter.

As described above, the three-dimensional land feature/ place name information database 5 shown in FIGS. 3A and 3B is configured to include each piece of data on ID 51 used for managing the land feature, a set of three-dimensional coordinates (NEH) 52 at a representative point, type 53 for indicating the type of the land feature, name 54, information URL 55, and a set of three dimensional coordinates (xyz) 56 at a representative point. The set of three-dimensional coordinates (NEH) 52 at a representative point and the set of three-dimensional coordinates (xyz) 56 at a representative point can be obtained by simplifying the three-dimensional graphic information representing a land feature, and at least one set of the three-dimensional coordinates is defined for each land feature. The set of three-dimensional coordinates (NEH) 52 at a representative point specifies the location of a representative point of a land feature in terms of latitude (N), longitude (E) and height (H). A set of x-, y- and z-coordinate values obtained by converting a set of three-dimensional coordinates (NEH) 52 at a representative point into a set of three-dimensional coordinates in the three-dimensional geocentric coordinate system are registered in a set of three-dimensional coordinates (xyz) 56 at a representative point.

Thus, a correspondence between the sets of three-dimensional coordinates and ID is managed in a different data table. For a representative point, a point which is particularly in the center of attention of a land feature whose information is demanded should be registered. For example, the peak for a mountain, the center for a lake, and the center point on the first floor, or the roof top for a building can be representative points. For an extensive range of area, such as a park, multiple representative points may be allocated evenly throughout the area, for example.

FIG. 4 is a diagram showing an example of a configuration of the main data included in a delivery service subscriber list database 11 for specifying a mobile terminal device authorized to use the service. The data shown in FIG. 4 includes subscriber name 111, telephone number 112, term of subscription contract 113, and charge discount rate 114. The delivery service subscriber list database is configured to include such data by each subscriber.

FIG. 5 is a diagram showing an example of a frame configuration of data which each of the mobile terminal devices 3a and 3b asks the host system 6 for. As shown in FIG. 5, the data is configured by including an x-coordinate 201, a y-axis coordinate 202, and a z-axis coordinate 203 of a photographing point, a camera angle of view (an angle between the diagonal line and the x-y plane) 204, a camera posture (roll) 205, a camera posture (yaw) 206, a camera posture (pitch) 207, transmission source ID 208, a depth of field 209, the distance 210 to a subject, and the maximum telephoto distance 211. The coordinate values representing a photographing point can be obtained, for example, by the GPS according to the geodetic coordinate system, and the values are ultimately obtained by converting the latitude, longitude and height of the photographing point to a set of three-dimensional coordinates in the geocentric coordinate system. Alternatively, this coordinate conversion may be performed in the host system.

The depth of field is a value representing the range in which the camera photographing apparatus is in focus with a subject. The distance (in meter) to a subject is a value representing the distance between the focal point and a point at which the subject is in the best focus. The camera posture (roll)/(yaw)/(pitch) is expressed as an angle relative to the reference angle which is given when the photographing direction is even with the ground and facing true north. The maximum telephoto distance which is set by a user on the mobile terminal device from options, determines an effective retrieval distance from the photographing point to a representative point. Any representative point of land feature distant more than the effective retrievable distance is eliminated from retrieval. This value appropriately narrows down retrieval conditions for a target land feature, and also prevents land features on the other side of the world from being included in a retrieval result when the ground is inadvertently photographed.

Figures 6, 7:
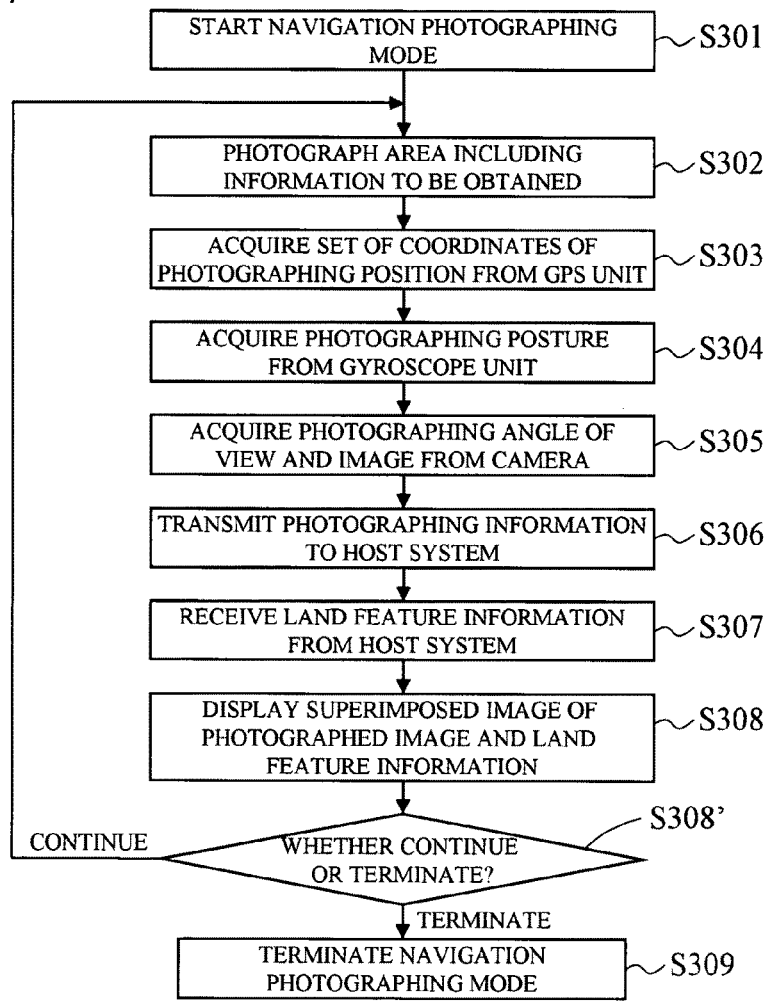
FIG. 6 is a diagram showing an example of a configuration of data which the mobile terminal device receives from the host system.
FIG. 7 is a flowchart showing the sequence of processes the mobile terminal device performs.

FIG. 6 is a diagram showing an example of the minimal configuration of data included in land feature information which the mobile terminal device receives from the host system. The data is configured by including ID 501 for managing land features, land feature name 502, on-screen display position 503 for indicating the position of a land feature within the unit circle which is drawn to include the corners of the photographed image and to have the photographing center as the center, land feature type 504, and information URL 505.

Descriptions will be provided below for operation of a pedestrian navigation system configured as described above. FIG. 7 is a flowchart diagram showing how a mobile terminal device is actually manipulated and thus operated. FIGS. 1 and 2 will be accordingly referred in the following description. First, an input apparatus 39 is set to a navigation photographing mode (S301). Next, an area including information to be obtained is photographed (S302) with the camera photographing apparatus 33. After an image of the surrounding area, for example, is obtained with the camera photographing apparatus 33, the mobile terminal device 3a acquires information on the current position with the GPS unit 32 (S303), posture information of the mobile terminal device 3 with the gyroscope unit 31 (S304), and a photographed image, the camera angle of view, the distance to a subject, and the depth of field (S305) with the camera photographing apparatus 33.

Figure 14:
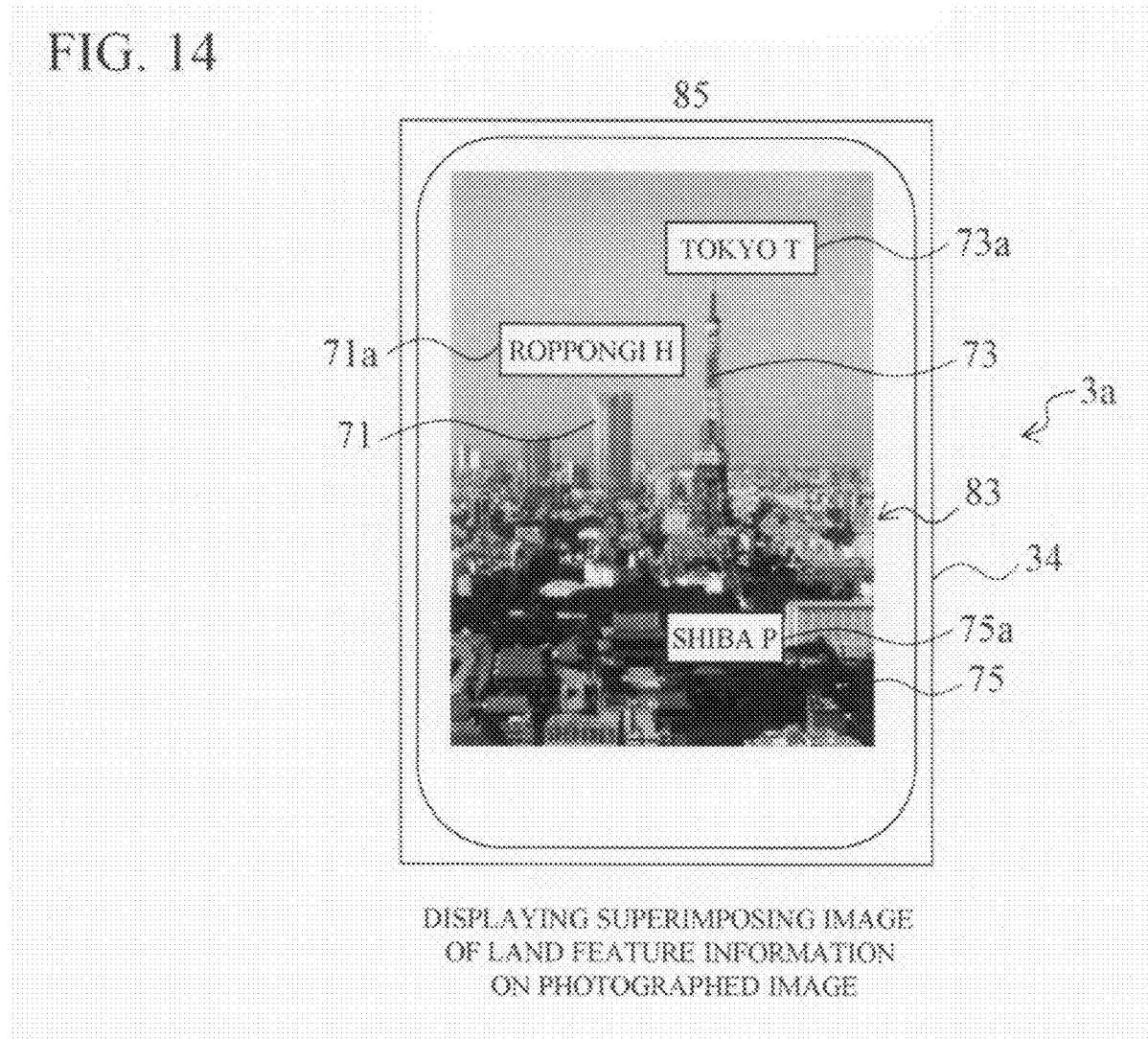
FIG. 14 is a diagram showing an example of a superimposing image of land feature information on an image of the land features shown on a display screen of the mobile terminal device.

The photographed image data and the acquired information are sent to the photographing data processor unit 351 in the data processor unit 35. The photographed image is sent from the photographing data processor unit 351 to the photographed image storage unit 37, whereas, in the photographing data processor unit 351, the acquired pieces of information are converted to transmission data (for details, see FIG. 5) to be transmitted to the host system. The photographing data processor unit 351 creates this data frame, and subsequently transmits the frame to the host system 6 via the transmitter-receiver unit 38 (S306). The host system receives this data, and then transmits the land feature information (for details, see FIG. 3), as a return value, to the mobile terminal device 3a (description will be provided later with reference to FIG. 8). The mobile terminal device 3a receives the land feature information, which has been transmitted from the host system, with the transmitter-receiver unit 38 (S307). The received land feature information is then transferred to the land feature/place name data processor unit 352 in the data processor unit 35 for analysis. Thereafter, the data processor unit 35 converts the photographed image data and the land feature information together into data which can be displayed, and send them to the display apparatus 34 for displaying them in a superimposing image. FIG. 14, to be described in the following section, is a diagram showing an example of a superimposing image (S308). After screen display is completed, when a user wishes to continue operation (S308'), the input apparatus 39 can move back to the photographing process S302. When a user wishes to terminate the operation (S308'), the input apparatus 39 can move on to a process of terminating the navigation photographing mode S309.

In a case where the camera photographing apparatus is provided with a dynamic image photographing function, the mobile terminal device is capable of handling photographed dynamic images by transmitting photographing information to the host system at intervals of a certain length of time in a snapshot manner, by receiving corresponding land feature information, and by displaying a superimposed image of the photographed dynamic images on the corresponding land feature information on the screen.

Figure 8:
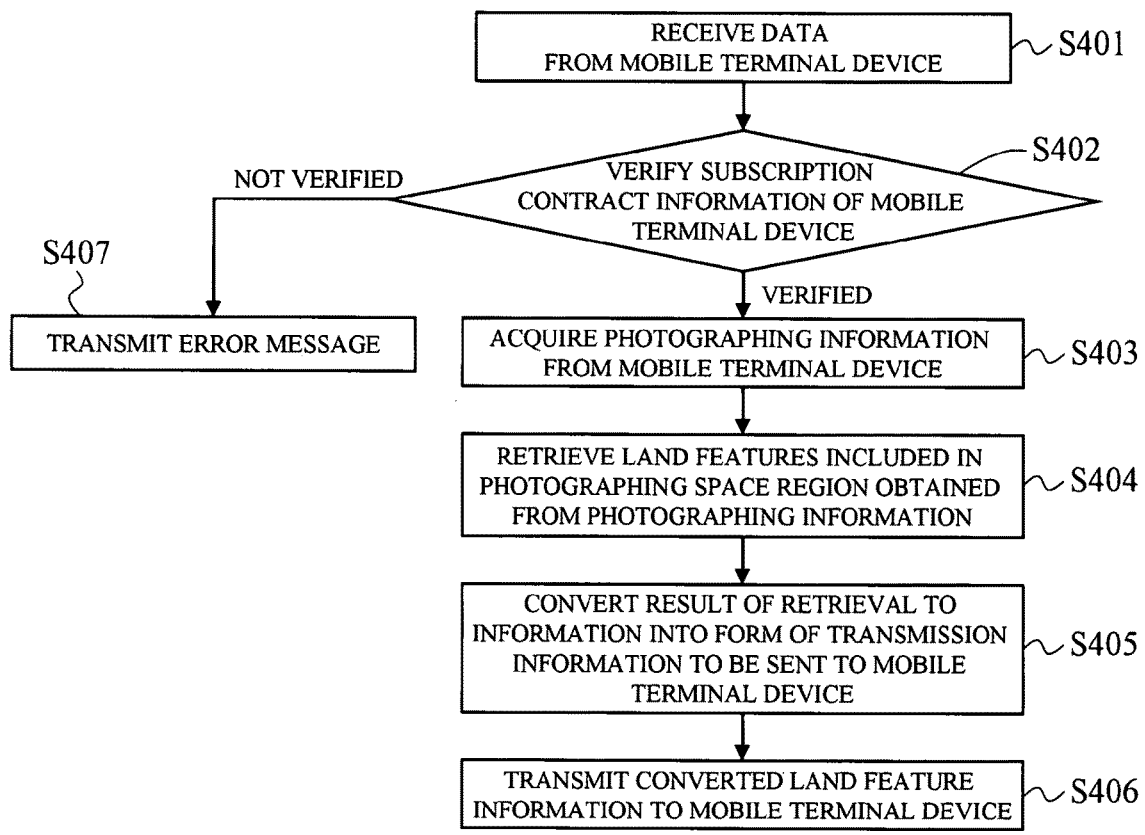
FIG. 8 is a flowchart showing the sequence of processes the host system performs.

FIG. 8 is a flowchart diagram showing the sequence of processes the host system 6 performs from retrieval of land feature information from the database on the basis of the data transmitted from the mobile terminal device 3a to transmission of a result of the retrieval to the mobile terminal device 3a. First, the host system 6 receives transmission data from the mobile terminal device 3a via the transmitter-receiver unit 8 (S401). The received data is transmitted to the retrieval processor unit 7. The retrieval processor unit 7 obtains a transmission source ID 208, and verifies it by referring to the delivery service subscriber list database 11 (S402). When there is subscriber information having the same telephone number 112 as that included in the acquired transmission source ID 208, and the access date is within the term of the subscription contract 113, the host system 6 determines the transmission source ID as being authentic. In a case where the transmission source is not registered in the list of the delivery service subscribers, the host system transmits an error message to the mobile terminal device 3 via the transmitter-receiver unit 8 at this time point, and terminates the process (S407). In the case where the transmission source is verified to be authentic, the host system causes the retrieval processor unit 7 to fetch the rest of the information on the photographing (S403), and to retrieve land features in the photographing space obtained from the photographing information (S404). Subsequently, the host system causes the retrieval processor unit 7 to convert coordinate values and to embed land feature-related information, such as a name and URL, based on the acquired information, and to convert the result into transmission information to be sent to the mobile terminal device (S405). The land feature-related information converted into the transmission information thereafter is transmitted to the mobile terminal device (S406).

FIGS. 9A and 9B are schematic diagram each showing an actual situation of photographing operation. FIG. 9A is the side view, and FIG. 9B is the top view. As shown in FIGS. 9A and 9B, the photographing space region is a three-dimensional cone-shaped region spreading out the direction of the photographing direction vector r (rx, ry, rz) and having the position P (x, y, z) of the mobile terminal device as the apex, and the camera angle of view θ as the apex angle. Among the acquired information on the photographing shown in FIG. 5, the x-coordinate 201, y-axis coordinate 202, and z-axis coordinate 203 of a photographing point may be regarded as the location of the focal point of the camera equipped in the mobile terminal device. The camera posture (roll) 205, a camera posture (yaw) 206, and a camera posture (pitch) 207 define the three-dimensional direction vector r (rx, ry, rz) indicating the photographing direction and a camera reference direction vector s (sx, sy, sz). The photographing direction r represents the direction the camera is directed, and the camera reference direction s represents the direction "the upper side of the photographing screen is looking toward." The angle of view 204 defines the angle of view θ representing the apex angle of the three-dimensional cone-shaped region. Furthermore, for the camera photographing apparatus provided with a focusing function, the effective range (a range being in focus) for the direction of the depth of field can be determined by acquiring the depth of field 209 and the distance 210 to a subject. Then, based on the photographing space region, the host system retrieves visible land features from the three-dimensional land feature/place name information database 5 (S404).

Figure 10:
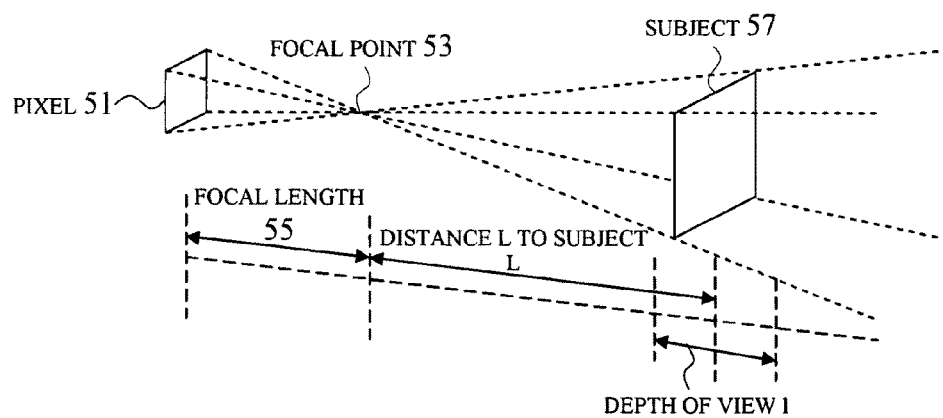
FIG. 10 is a diagram schematically showing a specific relationship between the distance to a subject and the depth of field.
Figure 11:
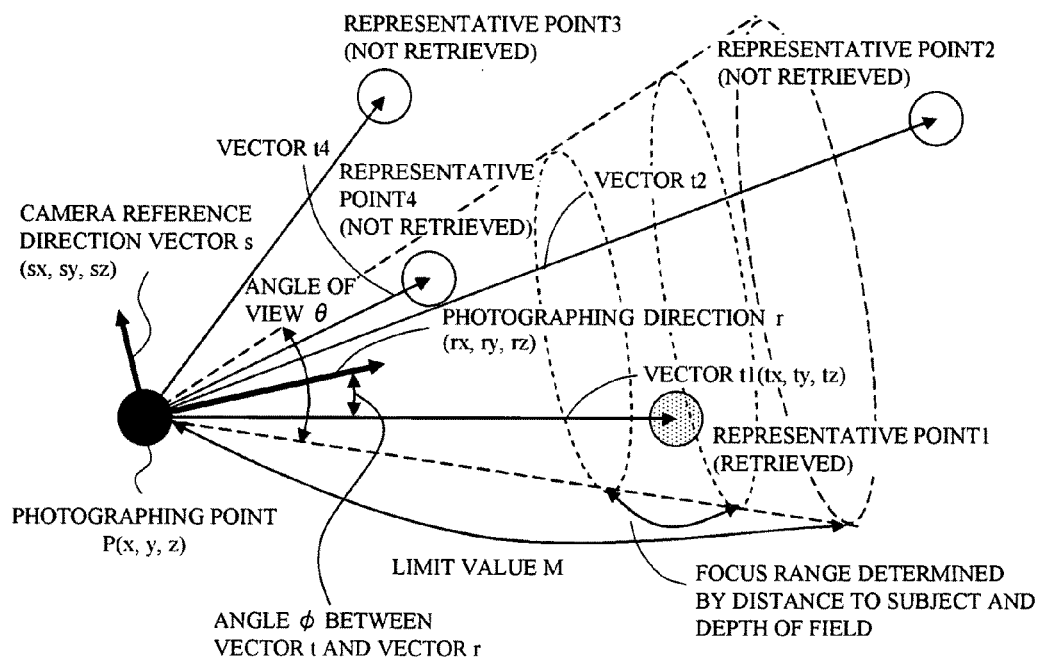
FIG. 11 is a schematic diagram showing an actual method of retrieving land features.
Figure 12:
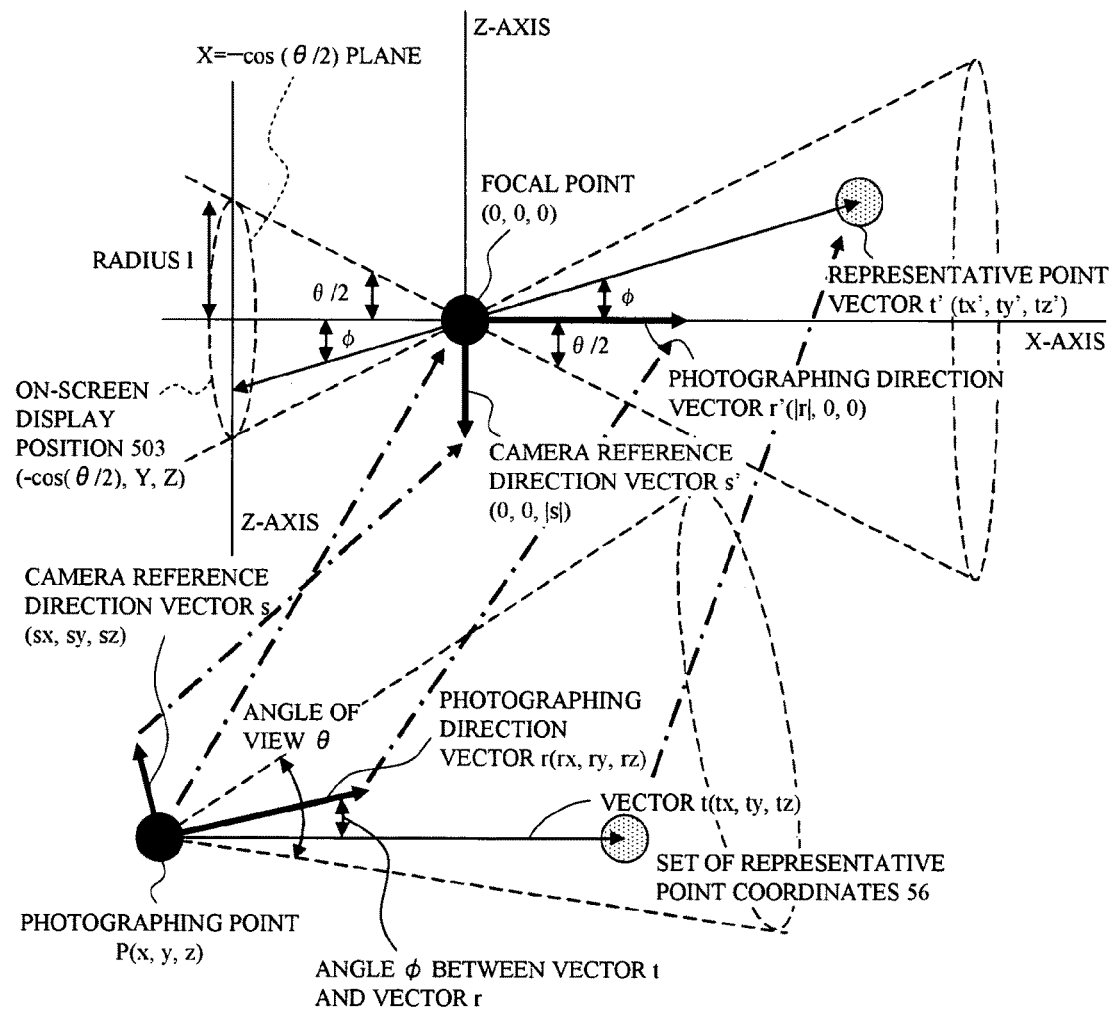
FIG. 12 is a schematic diagram showing a method of calculating a position at which a land feature is displayed on a screen (hereinafter referred to as an "on-screen display position) according to a set of coordinates of a representative point derived from the retrieval.

FIGS. 10 to 12 are schematic diagrams each showing a more specific method for retrieval conducted in S404. FIG. 10 is a diagram schematically showing the relationship between the distance L to a subject and the depth of field 1 when the subject 57 is photographed by the camera photographing apparatus in a general way. Since a retrieval result for the case where the camera focuses on the subject (with the focal point 53 and the pixels 51) does not include retrieval result of land features outside of the range of the depth of field 1, it is possible to obtain an appropriate retrieval result for the land feature which the user particularly wishes to know about.

As shown in FIG. 11, the position P (x, y, z) of the mobile terminal device 3, the photographing direction vector r (rx, ry, rz) and the reference direction vector s (sx, sy, sz) of the camera apparatus, and the angle of field θ can be obtained as conditions for retrieval in this case. For the camera photographing apparatus equipped with a focusing function, values of the depth of field 1 and the distance L to a subject can be additionally obtained. On the basis of these values, the cone-shaped region with the apex P at (x, y, z), the apex angle θ, and the direction r (rx, ry, rz) can be defined. When the depth of field 1 and the distance L to a subject can additionally be obtained, a circular truncated cone region in the range with the distance [L−1/2, L+1/2] from the focal position can also be defined. By identifying a representative point 45 (see FIG. 9) representing the land feature 43 located in the cone-shaped region or the circular truncated cone region, the host system is capable of performing the retrieval process.

It is preferable that data on extremely distant land features and land features out of site, such as those locating on the other side of the world, be excluded from the retrieval process performed by the host system for defining the cone-shaped region. In order to provide a suitable retrieval result, it is preferable that the terminal 3a be designed to enable the user to set up a limit value M (for example, 1 km, 5 km, 10 km and 50 km) for each of the distances from the focal position to the representative points 1-3 in the retrieval process for defining the cone-shaped region.

Conditions (Case 1) for retrieving land features included in the cone-shaped region are as follows:
(1) the length of t is the limit value M and below, and
(2) the angle of t to r is θ/2 and below,
where the vector from a focal point (x, y, z) to a representative point (a, b, c) is define as t (tx, ty, tz), and a photographing direction vector is defined as r (rx, ry, rz).

In the case where the depth of field 1 and the distance L to a subject can be obtained, conditions (Case 2) for retrieving a land feature included in the cone-shaped region are:
the above-described (1), and (2), and
(3) the distance R from a focal point to a representative point is within the range of [L−l/2, L+l/2].

In both cases, an actual retrieval SQL for acquiring the representative point column adopts the angle of the vector. Thus, retrieval of a set of coordinates of a representative point is performed not based on a set of coordinates (NEH) 52 but a set of three-dimensional coordinates 56 obtained by the conversion of the set of coordinates (NEH) 52. By use of the inner product formula of vectors and the length of vectors, SQL can be expressed as follows, for example:

In this case, t·r is the inner product of the vector, |t| is the length of the vector t, and |r| is the length of the vector r, and the relationship is expressed in the formula:

$$|t|=\mathrm{sqrt}(tx^2+ty^2+tz^2)$$

where sqrt (x) indicates the square root of x.

The inner product formula of the vector can be expressed as follows:

$$t \cdot r = (tx,ty,tz) \cdot (rx,ry,rz) = tx^*rx + ty^*ry + tz^*rz = |t||r|\cos(\alpha)$$

In this formula, cos denotes the cosine function, and α denotes the angle of (radian) of the vector t and the vector r. In this case, the above-described conditions (1)-(3) can be expressed as follows:
(1) Since the length of the vector t is M or shorter, $|t| \leq M$
(2) Where φ is the angle of the vector t to the vector r, according to the inner product formula, the following formula are true:

$$t \cdot r = |t||r|\cos(\phi)$$

$$t \cdot r / |t||r| = \cos(\phi)$$

Here, the angle of view θ is generally defined as 0<θ<π (radian). Since cos (θ) is a monotone decreasing function in this range, if θ≦α, $$\cos(\alpha) \geq \cos(\phi).$$

Therefore, if φ≦θ/2, $$\cos(\phi) \geq \cos(\theta/2).$$

Hence, the condition which causes the land feature to be included in the range of the angle of view can be expressed in the following formula:

$$t \cdot r / |t||r| \geq \cos(\theta/2).$$

(3) Since the length of the vector t is −l/2 and above and +l/2 and below, the relationship can be expressed as follows:

$$L - l/2 \leq |t| \leq L + l/2$$

Based on the result above, an actual retrieval SQL in Case 1 can be expressed as follows:
(Case 1)
Select*from the table of representative points
where (|t|≦M) and ((t·r)/|t||r|≦cos(θ/2)).

Similarly, an actual retrieval SQL for acquiring the land feature ID column in Case 2 can be expressed as follows:
(Case 2)
Select*from the table of representative points
where (|t|≦M) and ((t·r)/|t||r|≧cos (θ/2)) and L−l/2≦|t|≦L+l/2.

When these retrievals are applied to the case shown in FIG. 11, while the representative point 1 is retrieved, the representative point 2 is not retrieved because it is located beyond the limit value M set in the condition (1). The representative point 3 is not also retrieved because the angle φ defined in the condition (2) exceeds ½ of the angle of view (θ/2). The representative point 4 is not retrieved only in Case 2 because the representative point 4 is located out of the focused range defined in the condition (3) (The representative point 4 is retrieved in Case 1 which does not include the condition for the focus range).

Next, an operation (S405) for converting the retrieval result into a form of transmission information to be transmitted to the mobile terminal device will be described. A on-screen display position is obtained for the retrieval result on the basis of sets of three-dimensional coordinates 56 of the respective representative points, the photographing direction vector r, and the camera reference direction vector s. At this point, an affine transformation is acquired in which the focal point (x, y, z) is translated to the coordinate origin (0, 0, 0), then the photographing direction vector r and the camera reference direction vector s are each rotated with the origin as the center and displaced to r' (|r|, 0, 0), and to s' (0, 0, |s|), respectively. By applying the affine transformation to all the other sets of coordinates, it becomes possible to convert all of the sets of coordinates into the form which allows simple and easy calculation while the generality is maintained.

FIG. 12 is a diagram showing spatial arrangements before and after the affine transformation. FIG. 12 shows how each of the vectors is relocated in this particular case where only the parallel and rotational translations take place without enlargement or contraction by application of the three-dimensional affine translation. FIG. 12 shows the change from a pre-conversion condition shown in the lower drawing in FIG. 12, which is the same as FIG. 11, to a post-conversion condition shown in the upper drawing in FIG. 12. The y-axis is vertical to the drawing surface. As shown in FIG. 12, by application of the three-dimensional transformation, the on-screen display position (Y, Z) projected on a unit circle screen can be obtained as the intersection of the line with a direction vector t' including the coordinate origin (0, 0, 0) and the plane X=−cot(θ/2). Based on the land feature information obtained in the above-described processes, it is possible to configure the data (FIG. 6) to be received by the mobile terminal device.

FIG. 13A is a schematic diagram showing how sets of on-screen display position coordinates of the respective land features are displayed on the screen, and FIG. 13B is the legend for FIG. 13A. In a hypothetical situation where a unit circle 61 with a diagonal line 65 of the mobile terminal device screen 63 as the diameter and the center of the screen (marked with a white circle) as the center, land feature names are mapped onto the screen with the camera reference direction s at (0, 1) according to the acquired on-screen display position coordinates. Since on-screen display position coordinates are projected to the inside of the unit circle, the values are to be within the range of −1.0 to 1.0. By showing on-screen display positions on the unit circle coordinate system as described above, it is possible to define on-screen display positions without depending on hardware specification.

Although some land features located inside the unit circle 61 may not be included inside the screen 63 of the mobile terminal device, these land features are not distinguished from other land features and also to be included in the data to be transmitted to the mobile terminal device 3a. Since such land features are determined to be out of the screen of the mobile terminal device 3a, the land features are not displayed as a result. In a case where multiple representative points are retrieved for a single land feature, all of the multiple representative points or any one of the multiple representative points may be displayed. It is desirable that the selection can be done in the mobile terminal device. Data received by the mobile terminal device 3a as described above are transmitted to the mobile terminal device 3a via the transmitter-receiver 8 (S406)

FIGS. 13 and 14 correspond to each other. As shown in FIGS. 13 and 14, in the screen 85 of the display unit 3a, names 71a, 73a and 75a are displayed adjacent to the land features they are representing, 71, 73 and 75, respectively. This display enables a user to easily recognize locations and names of the specific land features appearing in the three-dimensional image which is the same as the landscape the user is actually seeing. Furthermore, as the direction the user is facing and sizes of land features change due to movement of the user, images and names of land features to be displayed on the screen are accordingly changed. Thus, this system has the advantage that a user can obtain navigation information according to the latest situation even if the user moves and thereby the screen changes its appearance.

As described above, in the case of the embodiment of the present invention, the mobile terminal device is designed to use an image photographed with its own camera photographing function as a background instead of using particularly background information among three-dimensional map information pieces, and therefore can acquire from the host system only data on names of land features and buildings which are observed (and possibly focused) based on the photographing condition information obtained from the photographing information. As a result, time required for the host system to process the data on the background, for the data to be transferred, and for the data to be displayed on the terminal device will be largely reduced. Hence, it becomes possible to configure three-dimensional map information based on the latest background map in the terminal device, and to operate the device smoothly and quickly. Furthermore, this system has the advantage to provide information which allows a user to accurately identify a target feature which he/she is currently focusing on.

References are shown as follows:
1) A reference regarding acquisition of geoid height based on latitude/longitude: http://vldb.gsi.go.jp/sokuchi/geoid/calcgh/calcframe.html
2) A reference regarding mutual reduction between the geocentric orthogonal coordinates and latitude/longitude: http://vldb.gsi.go.jp/sokuchi/surveycalc/transf.html

INDUSTRIAL APPLICABILITY

The present invention can be used for a navigation device utilizing a mobile telephone.

What is claimed is:

1. An image-related information displaying system comprising:
   a host system having a three-dimensional land feature/place name information database which stores three-dimensional land feature/place name information including information on three-dimensional position of land features and land feature-related information related to the land features; and
   a plurality of mobile terminal devices capable of being connected to the host system,
   wherein each of the mobile terminal devices includes an image photographing unit for photographing an image, a current-position detecting unit for detecting a current position, a three-dimensional posture/direction detecting unit for detecting a three-dimensional posture at a time of photographing and a photographing direction that the image photographing unit faces and a communications unit for transmitting to the host system the current position, the three-dimensional posture, the photographing direction, and focus information including a subject distance obtained by using the image photographing unit,
   the host system includes a retrieving unit for receiving the current position, the three-dimensional posture at the time of photographing, the photographing direction, and the focus information from one of the mobile terminal devices, and for, based on these received conditions, retrieving land feature-related information regarding land features that lie within a focal area from the three-dimensional land feature/place name information database, and
   each of the mobile terminal devices receives the land feature-related information retrieved by the retrieving unit and performs, without generating a three-dimensional map image, a superimposed display of the land features and the corresponding land feature-related information only with respect to the land features that lie within the focal area in the photographed image.

2. A mobile terminal device comprising:
   a current position detecting unit for acquiring a current position;
   a three-dimensional posture/direction detecting unit for detecting a three-dimensional posture at a time of photographing and a photographing direction;
   an image photographing unit for photographing an image; and
   a communications unit for transmitting to a host system the current position, the three-dimensional posture, the photographing direction, and focus information including a subject distance obtained by using the image photographing unit, the host system having a three-dimensional land feature/place name information database which stores three-dimensional land feature/place name information including information on three-dimensional position of land features and land feature-related information related to the land features;
   wherein the host system, upon receiving the current position, the three-dimensional posture at the time of photographing, the photographing direction, and the focus information from the communication unit and based on these received conditions, retrieves land feature-related information regarding land features that lie within a focal area from the three-dimensional land feature/place name information database, and
   wherein the communication unit receives the land feature-related information from the host system and performs, without generating a three-dimensional map image, a superimposed display of the land features and the corresponding land feature-related information only with respect to the land features that lie within the focal area in the photographed image.

3. The mobile terminal device as recited in claim 2, wherein based on a focusing function of the image photographing unit, a depth of field 1 and a distance L to a subject are acquired, a circular truncated cone region in a range with a distance [L−1/2, L+1/2] from a focal position is defined, a representative point which represents each of the land features located in the circular truncated cone is identified, and by recognizing any of the land features identified based on the representative point as visible land features, the land feature-related information is retrieved from the three-dimensional land feature/place name information database.

4. The mobile terminal device as recited in claim 2, wherein a three-dimensional cone-shaped region spreading out a direction of a three-dimensional direction vector r (rx, ry, rz) with a position (x, y, z) of the communications unit as an apex, and a camera angle of view θ as an apex angle, is defined as a virtual photographing space region, the position detected by the current position detecting unit is regarded as a focal position of a camera, based on the posture of the image photographing unit which has been detected by the three-dimensional posture/direction detecting unit, the direction vector r (rx, ry, rz) and a three-dimensional camera reference direction vector s (sx, sy, sz) are determined, and based on the angle of view of the camera, an angle of view θ representing the apex of the three-dimensional cone-shaped region is determined.

5. The mobile terminal device as recited in claim 2, wherein, when the position information is displayed, a coordinate system is defined within a unit circle plane with a diagonal line of a screen of a display unit as a diameter.

6. The image-related information displaying system as recited in claim 1, wherein based on a focusing function of the image photographing unit, a depth of field 1 and a distance L to a subject are acquired, a circular truncated cone region in a range with a distance [L−1/2, L+1/2] from a focal position is defined, a representative point which represents each of the land features located in the circular truncated cone is identified, and by recognizing any of the land features identified based on the representative point as visible land features, the land feature-related information is retrieved from the three-dimensional land feature/place name information database.

7. The image-related information displaying system as recited in claim 1, wherein a three-dimensional cone-shaped region spreading out a direction of a three-dimensional direction vector r (rx, ry, rz) with a position (x, y, z) of the mobile terminal device as an apex, and a camera angle of view θ as an apex angle, is defined as a virtual photographing space region, the position detected by the current position detecting unit is regarded as a focal position of a camera, based on the posture of the image photographing unit which has been detected by the three-dimensional posture/direction detecting unit, the direction vector r (rx, ry, rz) and a three-dimensional camera reference direction vector s (sx, sy, sz) are determined, and based on of the angle of view of the camera, an angle of view θ representing the apex of the three-dimensional cone-shaped region is determined.

8. The image-related information displaying system as recited in claim 1, wherein, when the position information is displayed, a coordinate system is defined within a unit circle plane with a diagonal line of a screen of a display unit as a diameter.

* * * * *